Sept. 21, 1948. H. N. FAIRBANKS 2,449,693
KINETOGRAPH MOVEMENT
Filed Sept. 24, 1945
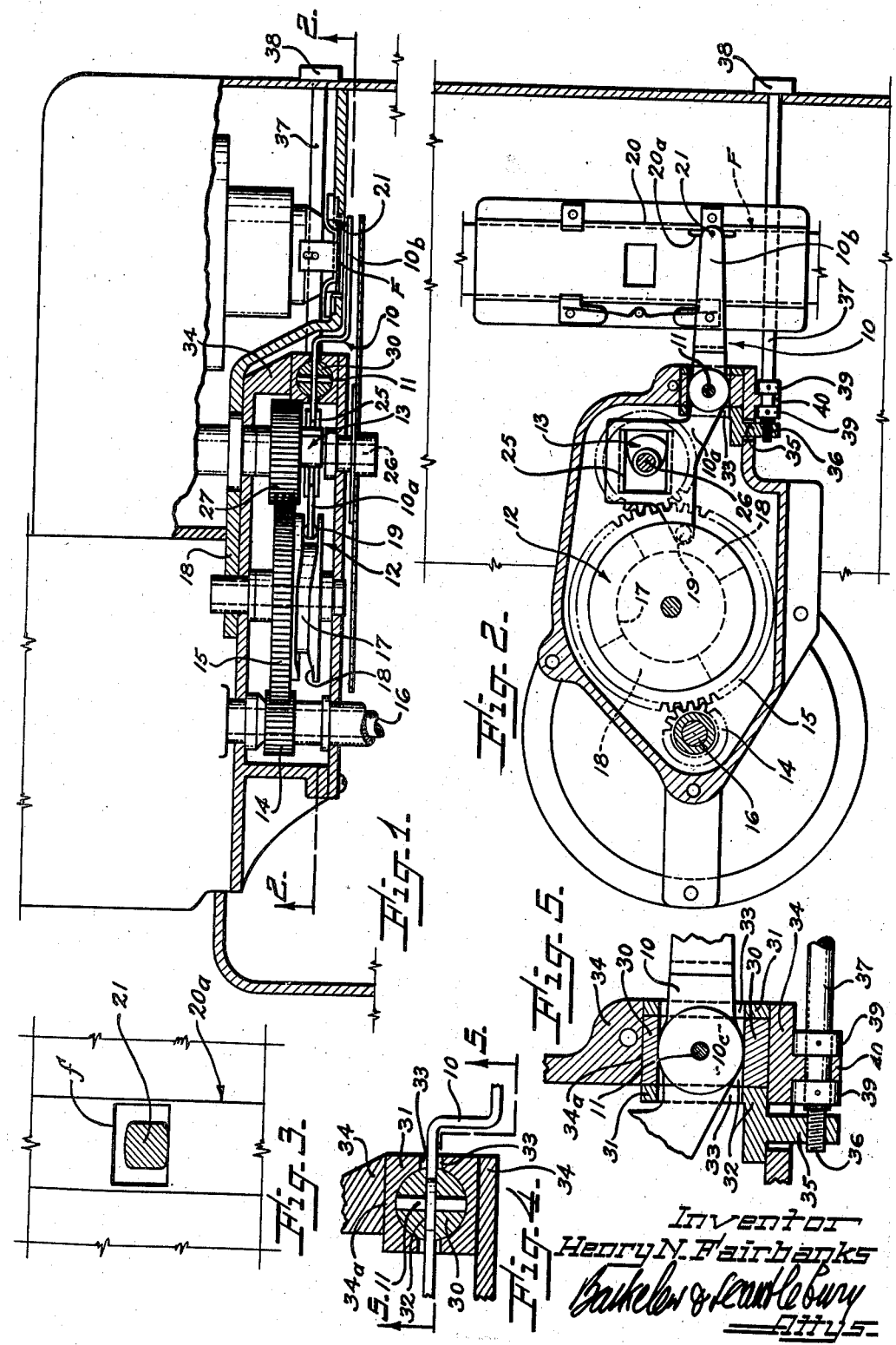
Inventor
Henry N. Fairbanks Patented Sept. 21, 1948

2,449,693

UNITED STATES PATENT OFFICE 2,449,693

KINETOGRAPH MOVEMENT

Henry N. Fairbanks, Beverly Hills, Calif., assignor to Mitchell Camera Corporation, West Hollywood, Calif., a corporation of Delaware Application September 24, 1945, Serial No. 618,159

8 Claims. (Cl. 88—18.4)

This invention has reference to kinetograph movements. Although the movement which is provided by this invention may be generally useful in any mechanism where film of the type of motion picture film is moved step by step, the invention is particularly useful in motion picture projectors and will accordingly be described with that use in view, but without implied limitation thereto.

As is well known, motion picture film is subject to variant shrinkage in the processes to which it is subjected, so that different projection positives may vary by a substantial amount in their longitudinal spacings of sprocket perforations. A projector which has a film engaging claw with a fixed film moving travel will not correspond accurately to all of the variant sprocket hole spacings, with the result that the sprocket perforations will be subjected to undue wear and enlargement and the film will then become incapable of being placed accurately in registered position by the movement mechanism. It is the primary purpose of this invention to provide an improved type of kinetograph movement which may be adjusted to variant sprocket hole spacings. This adjustment is effected by a relative movement between the pivot of the film moving claw and the claw actuating element (in this instance, a cam) in such a manner as to adjustably change the length of one lever arm of the claw system, and thereby to correspondingly change the film moving throw of the claw end of the lever. This method of adjusting the film moving throw of the claw may be applied to various types of movement mechanisms, but will be illustratively described herein as applied to a particular type of mechanism. The following detailed description, and the accompanying drawings, are thus to be taken only as an illustration of one typical embodiment of the invention.

In the accompanying drawings:

Fig. 1 is a plan section showing a projector mechanism embodying the illustrative form of the invention;

Fig. 2 is a section on line 2—2 of Fig. 1;

Fig. 3 is a diagram on an enlarged scale showing typical dimensional relations between the film perforation and the claw;

Fig. 4 is an enlargement of certain portions of Fig. 2, and

Fig. 5 is a detailed section taken as indicated by line 5—5 on Fig. 4.

The illustrative mechanism shown in the accompanying drawings embodies a claw lever 10 pivoted at 11 to swing in two planes, and operated by two cams 12 and 13. As shown in Figs. 1 and 2, lever 10 lies in a plane substantially parallel to the plane of film F in race 20, and extends in length transversely of the length of the film. Cam 12 is shown as driven by gearing 14, 15 from motor shaft 16, and has a peripheral cam groove 17 with two laterally spaced offsets 18. A ball or similar formation 19 on the extreme end of lever arm 10a follows cam groove 17; and the cam thus has the function of shifting the end of lever arm 10a back and forth in a horizontal plane twice for each revolution of the cam. That cam movement swings the other lever arm 10b back and forth horizontally to and from the film F in the vertical film race 20, to enter claw 21 into the film and to withdraw it from the film in timed relation with the longitudinal, vertical movements of the claw.

The other cam 13 is shown here as a cam of the boxed type, playing in an elongated box formation 25 in lever arm 10a. A circular eccentric or any other equivalent member may be used instead of the cam of the form illustrated. For the purpose of my invention it is only necessary that the arm actuating unit (e. g. the cam 13) and its engagement with the lever be of such a nature that the lever can be moved relative to that actuating unit to adjustably shift the point or points of cam engagement on the lever and thus to change the effective length of the lever arm. As shown here, that is accomplished by elongating the box 25 so that cam 13 does not engage the ends of the box in any adjusted position of the lever. Cam 13 thus has only the function of swinging the lever in a vertical plane. Cam 13 is here shown as mounted on shutter shaft 26 driven by gear 27 from gear 15 at a two to one ratio. The various parts of the mechanism are so proportionately dimensioned and timed that cam 12 first moves claw 21 into a film perforation, cam 13 then swings the claw arm 10b downwardly to move the film downwardly, cam 12 then swings the claw arm to withdraw the claw from the film, and cam 13 then moves the claw arm upwardly on its return stroke to its upper position where another cycle of operation is commenced.

Pivot 11 is mounted in such a manner as to be movable in a direction longitudinal of claw arm 10b, and so as to have at least a component of movement along the line which extends between pivot 11 and cam shaft 26. Movement of pivot 11, as shown in the drawings, is in a horizontal direction in Fig. 2 and thus does not vertically displace the mean or central position of claw arm 10b, which lies substantially in a horizontal position at the middle of its movement. That horizontal movement of pivot 11, carrying the lever 10 with it, changes the distance between pivot 11 and cam shaft 26, so as to change the effective length of that lever arm of the claw lever, and thus to change the length of the vertical throw of claw pin 21.

Cam 13, or its equivalent, may engage the lever 10 at any suitable point. It it only necessary that the line extending from pivot 11 to cam axis 26 be not at right angles to the line along which lever pivot 11 is shifted for stroke adjustment. The particular relative positioning of cam 13 shown in the drawings is merely illustrative.

A preferred form of pivot element for lever 10 is shown in the drawings, and more particularly in Figs. 4 and 5. As there shown, the lever is directly mounted on the pivot pin 11 which is mounted in a cylindric bearing block 30, which in turn is mounted on a vertical axis in a cylindric bore in the carrier block 31. Cylindric bearing block 30 is vertically slotted with a slot 32 and lever 10 fits in that slot snugly but free to swing in a vertical plane about axis 11. Bearing block 30 swings in a horizontal plane in carrier block 31 with lever 10, and block 31 is provided with vertical slots 33 of sufficient width and height to accommodate the relative movements of the lever. The lever has a circular formation 10c, around pivot pin 11, which not only fits slot 32 snugly in width but also in length (see Fig. 5) to seal off leakage of grease or oil through the slot. The pivot element, composed of horizontal pivot 11 and the bearing block 30 carrying it and mounted to rotate on a vertical axis, allows the lever to swing in vertical and horizontal planes, but restricts the lever against rotation about its own longitudinal axis and thus keeps the lever and its box 25 in proper alinement with cam 13.

Carrier block 31 is mounted in a horizontal slide guide which is here shown as a simple parallel faced opening 34a in a part of the casing 34 which incloses the gears and cams. As is shown in the drawings, the carrier block and its carried pivot structure virtually seal the opening. A lug 35 extends from carrier block 31 and is screw-threadedly engaged by the screw-threaded end 36 of an adjustment shaft 37 having an adjusting head 38 on its outer end. Shaft 37 has two collars 39 at opposite sides of a lug 40 which projects from the casing, so that shaft 37 is held longitudinally immovable and its rotation will move carrier block 31 back and forth through the desired adjustment distance in the direction spoken of above.

The elongation of cam box 25, and the depth of cam groove 17 are both made sufficient to accommodate the longitudinal horizontal movement of the claw arm. The relation between claw pin 21, the film perforation f, and the slot 20a through which pin 21 enters film perforation f, is shown in enlarged diagram in Fig. 3. Using dimensions which are typical of a 16 mm. film, for which the present mechanism is specifically designed, the claw 21, approximately square in cross section, has cross-sectional dimensions of about 0.040". The standard film perforation is 0.050" high and 0.072" wide. Those relative dimensions leave a total adjustment space of 0.032" through which claw 21 may be moved horizontally in the adjustment movements of the claw arm. The normal standard perforation spacing for 16 mm. film is 0.300"; and the amount of adjustment which is allowed by the given relative dimensions have been found sufficient to compensate for all of the variant film dimensions which are encountered in ordinary practice.

Using the adjustment which has been described, the operator simply adjusts knob 38 to adjust the vertical throw of the claw to be more or less accurately equal to the perforation spacing which exists on the film which he is projecting. He adjusts the movement until the claw throw is such that the claw enters the successive perforations freely and without rubbing or sawing on either the upper or lower edge of the perforation. That condition of rubbing or sawing can usually be determined by hearing; so the operator simply adjusts the movement until the sawing or rubbing sound disappears.

I claim:

1. In kinetograph movements of the type which embody a film guide, a film engaging and moving lever which lies in a plane substantially parallel to the plane of the film guide and which extends in length transversely of the length of the film guide, the lever being pivoted for swinging film-moving motion in said parallel plane and also in a plane at substantially right angles thereto to engage and disengage the lever with the film, and means for moving the lever in the last mentioned plane; the improvement which comprises the combination of a lever actuating unit of the nature of a cam mounted on a fixed axis and acting to swingingly oscillate the lever in its film-moving motion in said parallel plane, the engagement of the cam with the lever being such that the lever is adjustably movable lengthwise with relation to the cam, an adjustably movable pivotal mounting for the lever comprising a pivot element permitting swinging motion of the lever about two transverse axes which are fixed with relation to the lever, and a pivot carrying member which is adjustably shiftable toward and away from the cam axis, and means for adjustably setting the position of the carrying member to shift the lever and thereby adjust the point of cam engagement on the lever.

2. The improvement in kinetograph movements defined in claim 1 and in which the movable pivotal mounting comprises a slotted cylindric bearing block through which the lever extends, a pivot which carries the lever and which is mounted in said cylindric bearing block on a pivot axis at right angles to the cylindric axis of the block, a carrier block having a cylindric bore rotatably receiving the cylindric block, and guide means for the carrier block guiding it for movement longitudinally of the lever.

3. The improvement in kinetograph movements defined in claim 1 and in which the movable pivotal mounting comprises a slotted cylindric bearing block through which the lever extends, a pivot which carries the lever and which is mounted in said cylindric bearing block on a pivot axis at right angles to the cylindric axis of the block, a carrier block having a cylindric bore rotatably receiving the cylindric block, and guide means for the carrier block guiding it for movement longitudinally of the lever, and a rectilinear guide for the carrier block guiding it for movement longitudinally of the lever; and the adjustably setting means comprising a threaded member engaging the carrier block.

4. In kinetograph movements, a swinging film moving lever having a film engaging claw at one end, a slotted cylindric bearing block through which the lever extends, a pivot which carries the lever and which is mounted in said cylindric bearing block on a pivot axis at right angles to the cylindric axis of the block, a carrier block having a cylindric bore rotatably receiving the cylindric block, guide means for the carrier block guiding it for movement longitudinally of the lever, and means for adjustably setting the position of the carrier block in the guide means.

5. A kinetograph movement as specified in claim 4 and in which the guide means includes a rectilinear guide for the carrier block guiding it for movement longitudinally of the lever, and also in which the last mentioned means is a threaded member engaging the carrier block for moving it.

6. In kinetograph mechanisms, a swinging film moving lever having a film engaging claw at one end, a slotted cylindric bearing block through which the lever extends, both the claw end of the lever and the opposite end portion of the lever projecting outside the bearing block, lever moving mechanism acting on said opposite end portion, a casing having walls surrounding said moving mechanism and said opposite end portion of the lever, a pivot which carries the lever and which is mounted in said cylindric bearing block on a pivot axis at right angles to the cylindric axis of the block, a rectangular carrier block having a cylindric bore rotatably receiving the cylindric block, one of the casing walls having a rectangular opening therethrough forming a rectilinear guide in which the carrier block fits to close the opening and to be guided for adjustment movement in a direction longitudinally of the lever, and means for adjustably setting the position of the carrier block in the opening to adjust the relation of the lever to the lever moving mechanism.

7. In kinetograph movements, a swinging film moving lever having a film engaging claw at one end, a slotted cylindric bearing block through which the lever extends, a pivot which carries the lever on an axis fixed with relation to the lever and which pivot is mounted in said cylindric bearing block on a pivot axis at right angles to the cylindric axis of the block, a carrier block having a cylindric bore rotatably receiving the cylindric block, lever actuating means for swinging the lever about the cylindric axis of the bearing block and lever actuating means for swinging the lever about the pivot axis, at least one of the said means comprising a unit of the nature of a cam mounted on a fixed axis and with relation to which the lever is adjustably movable in a longitudinal direction, and mounting means for the carrier block whereby it is adjustably shiftable to and from the cam axis to shift the lever and thus to shift the point of cam engagement on the lever.

8. In kinetograph movements, a swinging film moving lever having a film engaging claw at one end, a slotted cylindric bearing block through which the lever extends, a pivot which carries the lever at a pivot point fixedly longitudinally spaced on the lever from the claw and which pivot is mounted in said cylindric bearing block on a pivot axis at right angles to the cylindric axis of the block, a carrier block having a cylindric bore rotatably receiving the cylindric block, lever actuating means for swinging the lever about the cylindric axis of the cylindric bearing block and lever actuating means for swinging the lever about the pivot axis, at least one of the said means comprising a unit of the nature of a cam mounted on a fixed axis and with relation to which the lever is adjustably movable in a longitudinal direction, the lever having a cam surrounding box which is elongated in the length direction of the lever so that the cam engages only the lateral sides of the box, a rectilinear guide for the carrier block guiding it for movement longitudinally of the lever, and means including a threaded member engaging the carrier block for adjustably shifting the carrier block along the guide.

HENRY N. FAIRBANKS.

REFERENCES CITED

The following references are of record in the file of this patent:

UNITED STATES PATENTS

| Number | Name | Date |
| --- | --- | --- |
| 940,275 | Pink et al. | Nov. 16, 1909 |